United States Patent
Tholl et al.

(10) Patent No.: US 7,297,913 B2
(45) Date of Patent: Nov. 20, 2007

(54) MODULE FOR A LASER MEASURING DEVICE

(75) Inventors: Hans Dieter Tholl, Uhldingen (DE); Rainer Baumann, Überlingen (DE); Joachim Barenz, Uhldingen (DE)

(73) Assignee: Diehl BGT GmbH & Co. KG, Überlingen (DE)

( * ) Notice: Subject to any disclaimer, the term of this patent is extended or adjusted under 35 U.S.C. 154(b) by 137 days.

(21) Appl. No.: 11/101,681

(22) Filed: Apr. 8, 2005

(65) Prior Publication Data

US 2005/0230601 A1    Oct. 20, 2005

(30) Foreign Application Priority Data

Apr. 20, 2004    (DE)    ..................    10 2004 018 974

(51) Int. Cl.
*G02B 6/42*    (2006.01)
*G01C 3/08*    (2006.01)

(52) U.S. Cl. ............................. 250/206.1; 250/227.28; 356/4.01

(58) Field of Classification Search ............. 250/214.1, 250/227.28, 206.1; 356/5.02, 28.5, 4.01; 359/341.2; 398/143, 157, 139
See application file for complete search history.

(56) References Cited

U.S. PATENT DOCUMENTS

| | | | |
|---|---|---|---|
| 5,050,986 A * | 9/1991 | Gatto et al. | ................. 356/5.05 |
| 5,272,513 A * | 12/1993 | Vahala et al. | ............... 356/28.5 |
| 5,534,993 A * | 7/1996 | Ball et al. | .................. 356/5.09 |
| 5,548,438 A * | 8/1996 | Delavaux | ................ 359/341.2 |
| 5,574,589 A * | 11/1996 | Feuer et al. | .................... 398/92 |
| 5,694,408 A * | 12/1997 | Bott et al. | ...................... 372/6 |
| 5,835,199 A | 11/1998 | Phillips et al. | |

(Continued)

FOREIGN PATENT DOCUMENTS

| DE | 39 15 627 C2 | 11/1990 |
|---|---|---|
| WO | WO2003098263 A2 * | 11/2003 |

OTHER PUBLICATIONS

Christian N.L.; Passauer, L.K. (1989). Fiber Optic Component Design, Fabrication, Testing, Operation, Reliability and Maintainability. (pp. 62). William Andrew Publishing/Noyes. Online version available at: http://www.knovel.com/knovel2/TOC.jsp?BookID=191&VerticalID=0.*

(Continued)

*Primary Examiner*—Georgia Epps
*Assistant Examiner*—Christopher M Yealy
(74) *Attorney, Agent, or Firm*—Scully, Scott, Murphy & Presser, P.C.

(57) ABSTRACT

In a compact laser measuring device with a high level of transmission power the problem arises of the laser detector being dazzled by unwanted stray light.

To resolve that problem there is provided a module (2) for a laser measuring device (4) which includes a laser source (6, 36), a transmission light guide (8, 38a-d) optically connected to the laser source (6, 36), a laser detector (10), a reception light guide (12) optically connected to the laser detector (10), a transmission reception light guide (16, 42a-d, 54) and a coupling element (14, 40a-d) which optically connects the transmission reception light guide (16, 42a-d, 54) to the laser source (6, 36) and the laser detector (10), wherein the transmission reception light guide (16, 42a-d, 54) is operatively connected to a light amplifier element (22).

7 Claims, 2 Drawing Sheets

U.S. PATENT DOCUMENTS

| | | | |
|---|---|---|---|
| 6,788,407 B1* | 9/2004 | Higdon et al. | 356/301 |
| 7,031,051 B2* | 4/2006 | Liu et al. | 359/341.2 |
| 7,050,663 B2* | 5/2006 | Nikonov et al. | 385/14 |
| 2002/0075472 A1* | 6/2002 | Holton | 356/4.01 |

OTHER PUBLICATIONS

L. Morvan, et al. "Optically pre-amplified LIDAR-RADAR", Document No. XP-002332680, *Laser Radar Technology and Applications VI, Proceedings of SPIE*, vol. 4377, pp. 284-293, 2001.

S. W. James, et al., "Fibre optic based reference beam laser Doppler velocimetry", Document No. XP 000521060, *Optics Communications*, 119, Nos. 5/6, pp. 460-464, Sep. 15, 1995; and.

S. Radic, et al., "Feasibility of Hybrid Raman/EDFA Amplification in Bidirectional Optical Transmission", Document No. XP-001123195,*IEEE Photonics Technology Letters*, vol. 14, No. 2, pp. 221-293, Feb. 2002.

\* cited by examiner

MODULE FOR A LASER MEASURING DEVICE

BACKGROUND OF THE INVENTION

1. Field of the Invention

The invention concerns a module for a laser measuring device.

In regard to optical reconnaissance of the space around an aircraft or missile it can be advantageous to scan objects of interest which are detected in that surrounding space, using an active measuring beam. Such an active measuring beam can be a laser beam whose radiation which is reflected by the object is investigated for example in respect of transit time, phase position, polarisation or frequency.

2. Discussion of the Prior Art

In order to keep the structural space for a laser measuring device used for that purpose small, it is desirable to use only a single aperture for transmitting and receiving the transmission radiation and the received radiation. In that respect, the difficulty which arises is that of protecting the detector of the laser measuring device from transmission light which is reflected in an unwanted manner within the device. As the difference in sensitivity of the detector in relation to the power of the laser source is several orders of magnitude, screening of the detector is difficult, in particular if the laser measuring device is subjected to vibration during operation.

SUMMARY OF THE INVENTION

Therefore the object of the present invention is to provide a module for a laser measuring device, which permits the laser measuring device to be of a compact structure and which at the same time guarantees a high level of safeguard against the detector being dazzled by stray light.

That object is attained by a module for a laser measuring device which in accordance with the invention includes a laser source, a transmission light guide optically connected to the laser source, a laser detector, a reception light guide optically connected to the laser detector, a transmission reception light guide and a coupling element which optically connects the transmission reception light guide to the laser source and the laser detector, wherein the transmission reception light guide is operatively connected to a light amplifier element.

The invention is based on the consideration that the component of the laser measuring device, which is most endangered in respect of stray light, is the coupling element by which the transmission light of the laser source is fed into the transmission reception light guide. The invention is further based on the consideration that, with a low level of transmission light power, the danger of dazzling of the detector by stray light can be reduced. The risk of stray light impinging on the detector can thus be reduced if the power of the transmission light is low at the moment of time of the feed into the transmission reception light guide. To avoid a long integration time therefore, subsequent amplification of the transmission light is advantageous. The risk of the detector being dazzled can be further reduced if the detector has a high level of saturation power and accordingly an only moderate degree of sensitivity. The reception signal should be amplified for that purpose.

The invention is further based on the consideration that the transmission light and the reception signal can be amplified jointly by just one single light amplifier element if the light amplifier element is arranged in a jointly used beam path. That makes it possible to save on components and structural space. The operative connection of the light amplifier element with the transmission reception light guide makes it possible to achieve a compact structure and a high level of radiation emission power for the laser measuring device with a moderate transmission power from the laser source and sensitivity in respect of the laser detector and thus with a low level of risk of the laser detector being dazzled.

The laser measuring device can be provided for measuring the transit time, phase position, polarisation or frequency of the incident laser light, for example for the purposes of measuring distance or speed, for spatial measurement or scanning the surface nature or absorption or scatter properties of the object in question, an object cloud, for example an aerosol cloud, or for producing an image of an object scene. The term light is used hereinafter to denote electromagnetic radiation from the infrared to the ultraviolet frequency range.

A particularly high level of power of transmission radiation from the laser measuring device can be achieved by pulse operation of the laser measuring device. For that purpose the light amplifier element is desirably connected to a pump source for optically pumping the light amplifier element. Optical pumping causes electrons to be raised to a level of increased energy in the light amplifier element and they are de-excited by an excitation of transmission light of the laser source within a short time interval, thereby implementing the emission of an amplified light pulse from the laser measuring device.

A light amplifier element which is in the form of an amplifier fibre is particularly simple and compact. Such a light guide is usually a fibre-form, doped and in particular flexible element with light-conducting properties.

In the simplest case the coupling element can be in the form of a passive optical-fibre connecting coupler in which two—or possibly even more—light guides are disposed in parallel relationship with each other and are merged together over a portion thereof. The radiation from the laser source is fed with a low level of loss into the transmission reception light guide while the reception signal is coupled into the reception light guide with at least 3 dB loss.

Desirably the coupling element is a switching element with which the transmission light guide can be optically separated from the transmission reception light guide. Beam division of the received light and a concomitant loss of radiation power can be avoided.

Optical closure of the reception light guide can be achieved by a coupling element in the form of a switching element with which the reception light guide can be optically separated from the transmission reception light guide. The detector can be protected from incident and unwanted radiation. The switching element can be an optical circulator which allows in temporal succession either the optical connection between the transmission light guide and the transmission reception light guide or the transmission reception light guide and the reception light guide. It is also possible for the switching element to be in the form of an electro-optical switch in which, by utilising the electro-optical effect, the change in the refractive index n of a material of the switching element, when a voltage is applied, is used for light beam deflection.

A particularly low level of radiation loss due to the coupling element can be achieved if the coupling element includes a micro-optical, in particular a micro-optomechanical element. A micro-optical element can be a switchable micro-optical grating structure or a micro-optical closure shutter in the form of a so-called 'flipping pixel'. Such an optical shutter element which is also referred to as a 'flixel' permits switching between two states in which the light can pass unpolarised and with a high degree of transmission through an opening or—after the opening is covered over—it can be reflected. A micro-optomechanical element has a movable mechanism which is driven by a micro-mechanical drive, such as for example a piezoelectric drive. The element can be a micromirror which switches digitally between two states or which is in the form of an oscillator. It is also possible to envisage an oscillating micro-tuning fork in which a mirror or a covering means is moved in front of a micro-aperture on the basis of the principle of resonance oscillation. Micro-optical elements permit unpolarised light to pass through and are thus particularly suitable for use jointly with multi-wave or multi-mode light guides.

Desirably the transmission reception light guide is a multi-mode guide. In that way it is possible to achieve a low level of sensitivity in respect of the laser measuring device in relation to vibration as the numerical aperture of a multi-mode guide is greater than the numeral aperture of a single-mode guide. It is possible to achieve simple coupling of the transmission light or a measuring signal into the light guide. In addition it is possible to achieve high degrees of amplification by the light amplifier element.

A further advantage is achieved if the reception light guide includes an optical shutter element. The laser detector can be screened from unwanted stray light by an optical shutter element. The shutter element is switchable so that the reception light guide can be closed during the emission of a light pulse by the laser source and can be opened to receive a measurement signal. The shutter element is provided in addition to the coupling element so that the laser detector can be screened from stray light which causes interference and which is produced by the coupling element or is not kept away therefrom. The shutter element can be a micro-optical system.

Desirably the shutter element is a light amplifier. That provides that the reception signal can be amplified once again. Particularly advantageous is a semiconductor-based shutter element which can be optically pumped. In the pumped condition the shutter element is transparent so that a reception signal can pass therethrough. During emission of transmission light by the laser source the shutter element is desirably in an unpumped condition in which incoming laser light is greatly absorbed by the shutter element. In that condition the shutter element acts as a light barrier. The barrier action is only removed again by a renewed pump pulse.

The invention also proposes that a light filter is arranged at the transmission reception light guide. In that way background radiation which impinges on the laser measuring device and which would possibly be amplified by the light amplifier element together with the measurement signal can be filtered out. The light filter is desirably tuned to the frequency of the laser source.

Tunable emission, which is precise in respect of time, of a high-power transmission pulse can be achieved by a plurality of transmission reception light guides which each include a respective light amplifier element which is optically activatable by the laser source. The light amplifier elements can be activated at the same time by a transmission pulse emitted by the laser source so that this affords a definable transmission pulse, which is precise in respect of time, in the transmission reception light guides. Such time-synchronised activation can be effected by de-excitation of excited electrons in a short time interval. The light from the laser source can be coupled into the transmission reception light guides by one or more transmission light guides.

A further advantage is achieved if there is provided a pump source for exciting the light amplifier elements. Components and structural space can be saved by virtue of the joint pumping of a plurality of light amplifier elements by one pump source. Desirably, there are provided a plurality of pump sources which jointly pump a plurality of elements, for example three pump sources for nine light amplifier elements.

Spatially precise and flexible orientation of a transmission pulse leaving the laser measuring device can be achieved by an optical multiplexer which is connected to the transmission reception light guide and which is connected to a plurality of further transmission reception light guides. In that respect the further transmission reception light guides are advantageously provided for emission of the transmission pulse in different directions in space.

BRIEF DESCRIPTION OF THE DRAWINGS

Further advantages will be apparent from the description of the drawing hereinafter. The drawing shows embodiments by way of example of the invention. The drawing, the description and the claims set out numerous features in combination. The man skilled in the art will also appropriately consider the features individually and combine them together to provide further suitable combinations.

In the drawing.

DETAILED DESCRIPTION OF THE INVENTION

Figure 1:
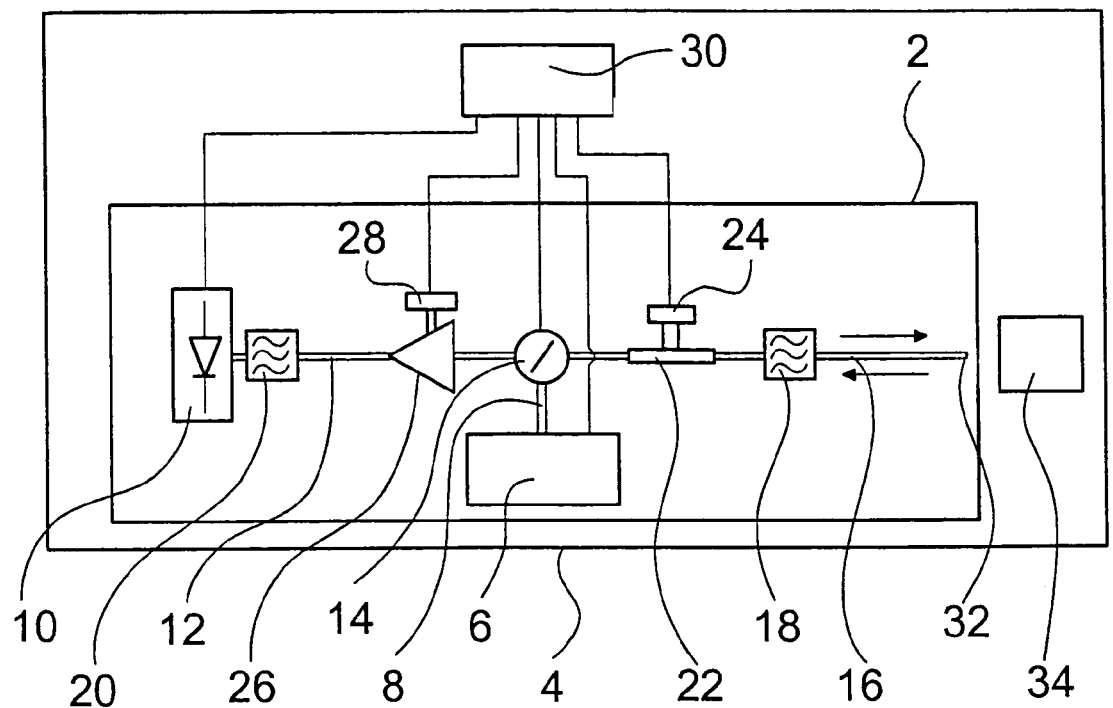
FIG. 1 shows a module for a laser measuring device.

FIG. 1 shows a module 2 for a laser measuring device 4 having a laser source 6 serving as a master oscillator, an optical transmission light guide 8 connected to the laser source 6, a laser detector 10 and a reception light guide 12 optically connected to the laser detector 10. The module 2 also includes a coupling element 14 which couples laser radiation produced by the laser source 6 from the transmission light guide 8 into a multi-mode transmission reception light guide 16. A respective light filter 18, 20 is arranged at each of the transmission reception light guides 16 and the reception light guide 12. The light filters 18, 20 each allow transmission in a narrow frequency range which is around the transmission frequency of the laser source 6.

A part of the transmission reception light guide 16 is in the form of a light amplifier element 22 in the form of an amplifier fibre which is connected to a pump source 24. Arranged in the reception light guide 12 is a shutter element 26 in the form of a semiconductor device which is connected to a further pump source 28. A control unit 30 is electrically connected to the laser detector 10, the pump sources 24, 28, the coupling element 14 and the laser source 6 for control of the respective elements.

For the purposes of implementing a measurement procedure with the laser measuring device 4 or for recording a pixel of an image of an object scene surrounding the laser measuring device 4, a light pulse is emitted by the laser source 6. The light pulse is guided through the transmission light guide 8 to the coupling element 14 which is in the form of a flipping pixel or flixel. The flixel is disposed in a virtually closed state in which the transmission pulse is reflected by the flixel, more specifically into the transmission reception light guide 16. There, the transmission pulse impinges on the light amplifier element 22 which is in the form of an amplifier fibre. At that moment the light amplifier element 22 is in a pumped condition in which energy radiation of the pump source 24 into the light amplifier 22 provides that a large number of electrons in the light amplifier 22 are excited to an increased-energy level. The conditions are de-excited in stimulated mode by the transmission pulse, whereby the transmission pulse is amplified. The transmission light passes through the light filter 18 and an end 32 of the transmission reception light guide 16 which is near the focal plane of a telescope 34. The transmission light is collimated and emitted by way of the aperture of the telescope 34 into a space surrounding the laser measuring device 4.

The transmission light is reflected at an object from the object scene surrounding the laser measuring device 4 so that a reception signal impinges on the aperture of the telescope 34. From there the reception signal is focussed on to the end 32 of the transmission reception light guide 16 and passes into the transmission reception light guide 16. The reception signal passes the light filter 18 and is amplified similarly to the transmission pulse by the light amplifier element 22. The amplified reception signal then impinges on the coupling element 14 which is now in its opened state so that the reception signal can substantially unimpededly pass the coupling element 14.

While the shutter element 26 was in a non-pumped state and was thus substantially opaque in the period involving emission of the transmission pulse, the shutter element 26, when the amplified reception signal is received, is in a pumped state and thus transmits the reception signal which is amplified once again by the shutter element 26. The amplified reception signal passes through the light filter 20 and impinges on the laser detector 10 and is converted by its diode detector element which is sensitive in relation to infrared radiation, into an evaluatable voltage pulse. The voltage pulse is passed to the control unit 30 and evaluated there. After the reception signal has passed through the shutter element 26 the latter is not pumped any further and thus becomes substantially opaque. The flixel of the coupling element 14 switches into the reflecting state and the laser source 6 emits a renewed transmission light pulse.

Figure 2:
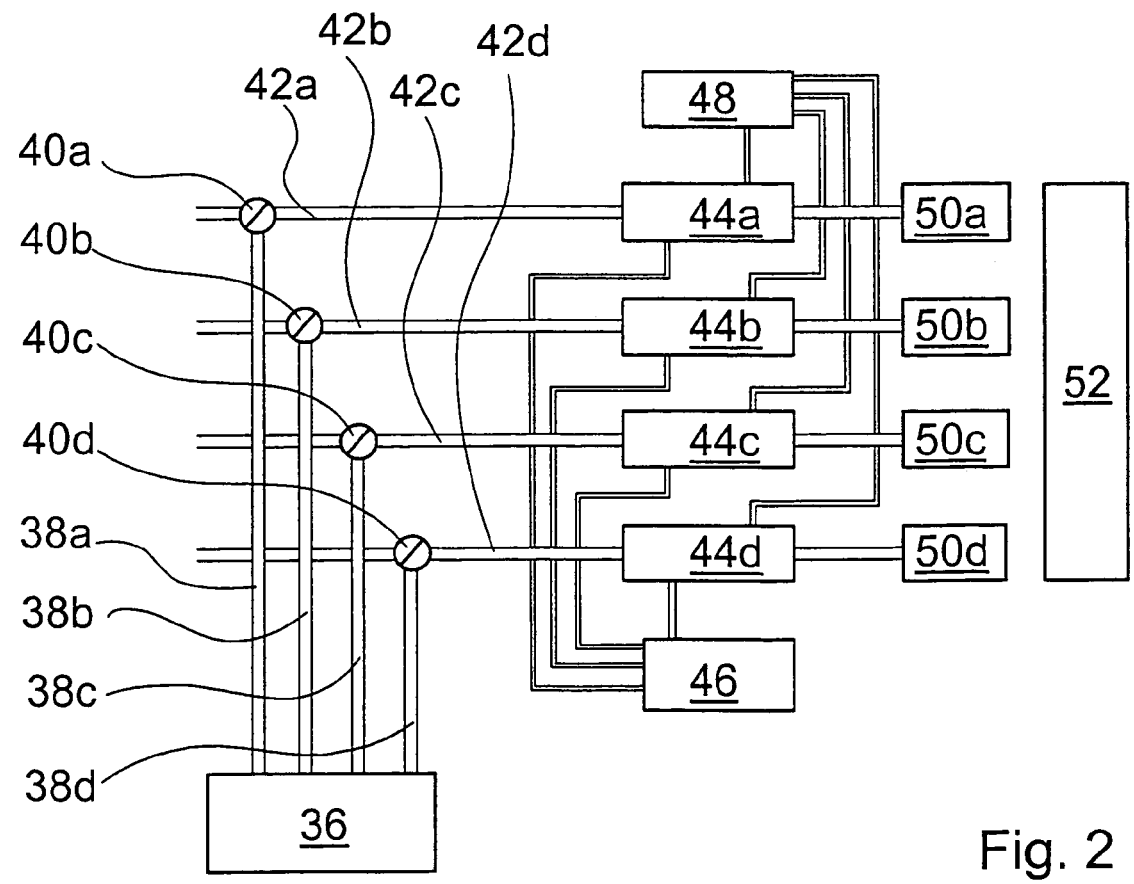
FIG. 2 shows a plurality of transmission reception light guides each having a respective light amplifier element.

FIG. 2 shows a portion of an alternative module for a laser measuring device having a laser source 36 which is connected to four transmission light guides 38a-38d. A transmission pulse produced by the laser source 36 can be coupled by four coupling elements 40a-d into respective ones of transmission reception light guides 42a-d, each of which includes a light amplifier element 44a-d in the form of a fibre amplifier. The transmission reception light guides 42a-d are connected by way of the coupling elements 40a-d by way of a respective reception light guide to one or more detectors (not shown). Each of the light amplifier elements 44a-d is connected to two pump sources 46, 48 which are provided for jointly pumping the four light amplifier elements 44a-d.

During operation a transmission light pulse is produced by the laser source 36 and at the same time fed by way of the transmission light guides 38a-d and the coupling elements 40a-d into the transmission reception light guides 42a-d. The transmission light pulses which are now four in number are amplified synchronously by the four light amplifier elements 44a-d and at the same time each reach a respective collimator 50a-d. In the collimated condition the respective transmission light pulses pass into an optical system 52 and are guided thereby into four adjacent portions of an object scene surrounding the laser measuring device. Reflected from an object, four respective reception signals pass through the optical system 52 and the collimators 50a-d into the transmission reception light guides 42a-d, they are amplified there, and they are passed through the transparent coupling elements 40a-d to a respective detector cell of a detector (not shown) and evaluated by a control unit 30. The spatial configuration of an object of interest in an object scene can be scanned by the emission of four transmission light pulses.

Figure 3:
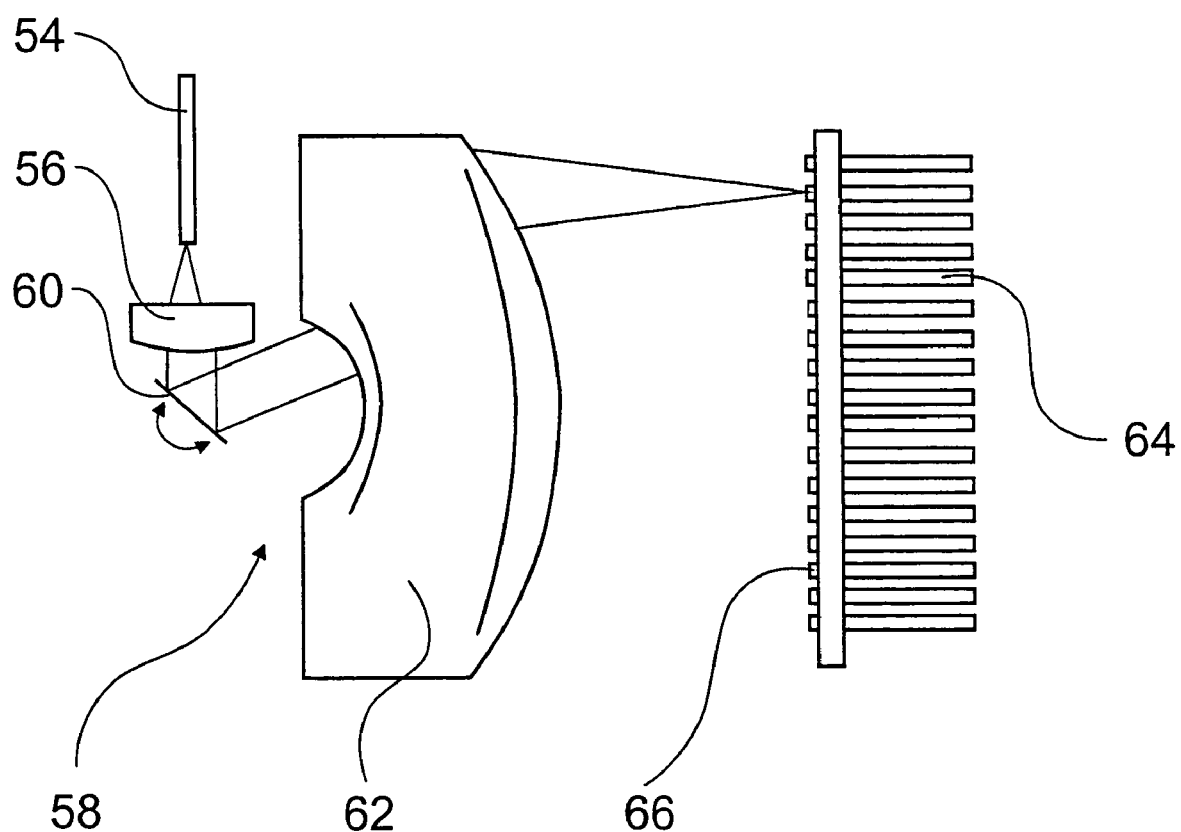
FIG. 3 shows an optical multiplexer having a plurality of transmission reception light guides.

A portion of a further module of a laser measuring device is shown in FIG. 3. The end of a reception transmission light guide 54 which is of a similar configuration to that shown in FIG. 1 is arranged in spatial proximity with a lens 56 of an optical multiplexer 58. The lens 56 serves for the collimation of the transmission pulses which issue in substantially undirected manner from the multi-mode transmission reception light guide 54. The collimated beam of the transmission pulse is coupled into an objective 62 by way of a rotary mirror 60. That objective 62, for example a telecentric F-theta objective, focuses the collimated transmission pulse independently of the angle thereof relative to the optical axis of the objective 62 on to an object plane. A plurality of guide ends 66 of transmission reception light guides 64 are arranged in that object plane linearly or in the form of a two-dimensional array, into which the transmission pulse is coupled. In dependence on the rotary position of the rotary mirror 60, the beam issuing from the transmission reception light guide 54 is coupled in that way in specific and targeted manner into a desired one of the transmission reception light guides 64. A uniformly high level of coupling efficiency into the respective transmission reception light guide 64 is achieved by the telecentric, optically parallel beam path of the objective 62, independently of the choice of one of the transmission reception light guides 64.

The rotary mirror 60 and the objective 62 can be of such a configuration that the incoming beam of the transmission pulse can be coupled into a linear arrangement of light guides. It is also possible that the rotary mirror 60 and the objective 62 are suitable for deflection of the incoming radiation into two axes so that the radiation can be coupled into a two-dimensional array of guide ends 66 of the transmission reception light guides 64. By means of a suitable optical system (not shown in FIG. 3), a transmission light pulse which is coupled into a transmission reception light guide 64 can be directed to a desired portion of an object scene. In that way, by means of the multiplexer 58, a transmission light pulse can be directed specifically and targetedly from the transmission reception light guide 54 into a desired portion and received from there by means of the optical system and fed into the transmission reception light guide 54 by the multiplexer 58.

LIST OF REFERENCES 2 module
4 laser measuring device
6 laser source
8 transmission light guide
10 laser detector
12 reception light guide
14 coupling element
16 transmission reception light guide
18 light filter
20 light filter 22 light amplifier element
24 pump source
26 shutter element
28 pump source
30 control unit
32 end
34 telescope
36 laser source
38a-d transmission light guide
40a-d coupling element
42a-d transmission reception light guide
44a-d light amplifier element
46 pump source
48 pump source
50a-d collimator
52 optical system
54 transmission reception light guide
56 lens
58 multiplexer
60 rotary mirror
62 objective
64 transmission reception light guide
66 guide end

The invention claimed is:

1. A module for a laser measuring device comprising a laser source, a transmission light guide, which is optically connected to the laser source, a laser detector, a reception light guide, which is optically connected to the laser detector, a transmission reception light guide and a coupling element which optically connects the transmission reception light guide to the laser source and to the laser detector, wherein the transmission reception light guide is operatively connected to a light amplifier element, the light amplifier element is connected to a pump source for optical pumping of the light amplifier element, the reception light guide includes an optical shutter element in the form of a light amplifier element, the light amplifier element is connected to a pump source for optical pumping of the light amplifier element and laser detector, pump sources, coupling element and laser source are electrically connectable to a control unit for control of the respectively elements.

2. A module according to claim 1, wherein the coupling element is a switching element through which the reception light guide is optically separable from the transmission reception light guide.

3. A module according to claim 1, wherein the transmission reception light guide is a multi-mode guide.

4. A module according to claim 1, wherein a light filter is arranged at the transmission reception light guide.

5. A module according to claim 1, wherein a plurality of said transmission reception light guides each include, respectively, a light amplifier element, which is optically activatable by the laser source.

6. A module according to claim 5, wherein a pump source is provided for excitation of the light amplifier elements.

7. A module according to claim 1, wherein an optical multiplexer is connected to the transmission reception light guide and which is connected to a plurality of further transmission reception light guides.

* * * * *